July 7, 1964   H. STOLLERMAN   3,140,338
SPECTACLE LENSES FOR UNILATERAL APHAKIA
Filed Feb. 20, 1961
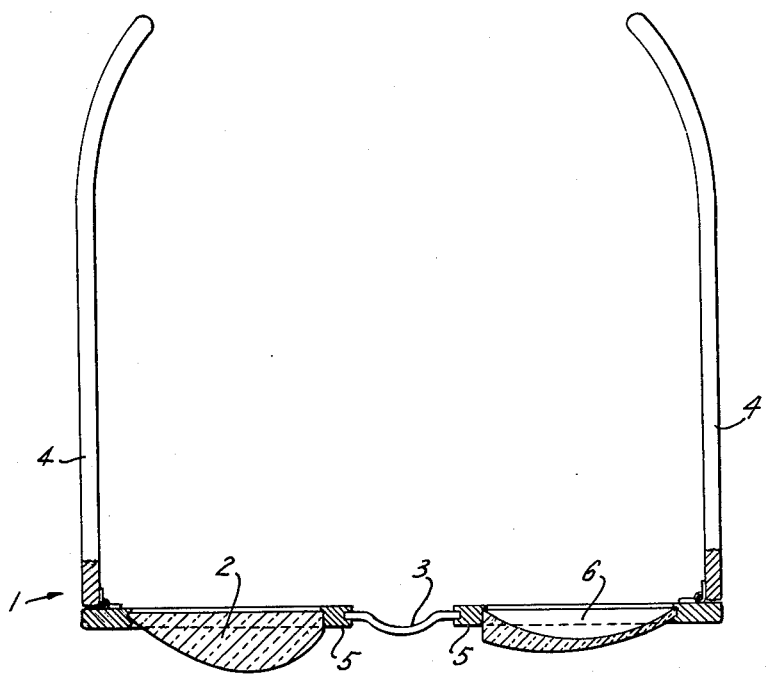
INVENTOR.
HARRY STOLLERMAN
BY Hans Berman
AGENT

United States Patent Office 3,140,338
Patented July 7, 1964

3,140,338
SPECTACLE LENSES FOR UNILATERAL APHAKIA
Harry Stollerman, Flushing, N.Y.
(89—08 Sutphin Blvd., Jamaica, N.Y.)
Filed Feb. 20, 1961, Ser. No. 90,350
7 Claims. (Cl. 88—54)

This invention relates to special spectacles and to a method of using the spectacles for alleviating difficulties of vision in a person suffering from unilateral aphakia, that is, having an aphakic eye in which a retina image is produced without an operative crystalline lens, and a second eye in which the image is produced by an internal crystalline lens. The second type of eye will hereinafter be referred to as a "complete eye."

When a cataract develops in one eye of a person, it is usual ophthalmological practice to remove the lens from the afflicted eye only. After extraction of the lens, the refractive power of the eye may be restored by a properly ground lens mounted in a spectacle frame. The dioptric power of the crystalline lens is replaced by a convex spectacle lens of approximately twelve positive diopters. Even with the use of lenses which restore perfect vision to the aphakic and to the complete eye individually, binocular vision is usually impossible.

When a person having one aphakic and one complete eye wears conventional corrective spectacles, fatigue, headache, diplopia, and other distressing symptoms develop. These symptoms promptly disappear when either one of the eyes is blocked off. Several explanations have been advanced for the unsatisfactory results achieved in binocular vision with lenses which individually give good monocular vision, but these explanations have not been universally accepted, nor have they led to the development of satisfactory spectacles for persons suffering from unilateral aphakia.

The different size of the retinal images produced by spectacle lenses differing in dioptric power by about twelve diopters and respectively cooperating with one aphakic and one complete eye has been held by some to cause the discomfort of the wearer. Yet, practical means for correcting the very great difference in retinal image size are not available. This hypothesis is considered altogether incorrect by others who ascribe the afore-described symptoms to difficulties in correlating the retina images with rotary movements of the eyes. The latter hypothesis also lacks full proof, and a successful method of avoiding the symptoms has not been based on it.

Until a few years ago, virtually all patients who had undergone unilateral extraction of a lens were unable to see with both eyes when wearing corrective spectacles, and it was standard procedure to block off the vision of one eye by an opaque shield after the operation. More recently, binocular vision has been restored to patients having one aphakic and one complete eye by the use of contact lenses which inherently produce in such patients retinal images of less disparate size than spectacles. Many patients who can be fitted with contact lenses are quite comfortable with them, but their comfort can be achieved only at some sacrifice in visual acuity, and true stereopsis is not possible. Moreover, the use of contact lenses is contraindicated in an appreciable number of persons, such as those whose sensory nerves have been damaged so that they would not be warned by pain in the eye against an incipient erosion of the cornea or other eye damage that may be caused by contact lenses. Others find contact lenses intolerable for purely subjective reasons which do not exist in the use of spectacles.

The principal object of the invention thus is the provision of spectacles which restore binocular vision to persons having only one aphakic eye.

A more specific object is the avoidance of diplopia and eyestrain associated with conventional spectacles producing retina images of greatly different size in such persons.

When fitting patients with corrective lenses after unilateral cataract operations, or after loss of one crystalline lens by accident or otherwise, I have frequently found that I may restore monocular vision by fitting the patient's eyes individually with suitably ground lenses. When these lenses are then combined in a common frame, and the frame is placed in the patient's face I usually observe that the aphakic eye turns inward toward the nose. Some patients are able to align the axes of their eyes for a short period by a conscious effort, but this effort causes eyestrain and fatigue. Most patients develop diplopia quite promptly. The severity of these symptoms is related to the overall visual acuity. As a general rule, the symptoms are more severe in persons of very good visual acuity than in those who cannot perceive a sharply defined image at optimum correction.

I have found that these patients whose eyes differ in dioptric power by approximately twelve spherical diopters can be successfully fitted with corrective spectacles when the two lenses of the spectacles, in addition to the spherical and cylindrical curvature required to correct refraction errors, are also ground prismatically, or are supplemented by prismatic lenses. The necessary prismatic correction has been found by experiment to have a total value of twelve prism diopters, base-in, in a person the refraction of whose eyes can be corrected to perfect or 20/20 vision. A prism diopter is the amount of prismatic deviation required to displace a light ray one centimeter at a distance of one meter. The term "base-in" indicates that the prism tapers in a direction from the nose toward the temple of the person wearing the spectacles.

The figures in Table I will serve as guides for fitting the prism component in spectacle lenses for persons having less than perfect binocular visual acuity when corrected as fully as possible. It will be understood that minor deviations from these figures may be necessary or advisable in individual cases, and such deviations will readily be determined by trial and error in the usual manner.

TABLE I

| Visual acuity, average of both eyes | 20/20 | 20/40 | 20/60 | 20/80 | 20/100 |
|---|---|---|---|---|---|
| Prism diopters | 12 | 10 | 8 | 6 | 4 |

The amount of prism correction required for optimum binocular vision thus decreases with a decrease in the combined or average visual acuity of both eyes that can be produced by correcting spherical and cylindrical refraction errors. Where the average of the corrected visual acuity of both eyes is less than 20/100, little difficulty is experienced by most patients with conventional spectacles, but those relatively few patients of low visual acuity who still suffer from eyestrain and other symptoms as described above after losing one crystalline lens can often be helped by adding prism power to the lenses of their spectacles.

The effect of base-in, or diverging, prisms may be obtained by prismatically grinding only one of the two lenses, but it is more practical to divide the total prism power required between both lenses in any convenient manner. The same effect is achieved by a twelve diopter base-in prism in one lens or in the other lens, or by prismatic correction of both lenses to a combined power of twelve prism diopters base-in. Considerations of appearance, difficulties which may be encountered in combining spherical and/or cylindrical curvature with the prismatic shape, and other factors well known to those skilled in the art will control the choice of one or another prism arrangement.

An aphakic eye of necessity cannot accommodate. Quite astonishingly, a person fitted with spectacles of my invention designed for viewing at a distance is capable of seeing binocularly matter relatively close to the eye on which a person lacking all accommodation would not normally be expected to focus properly. I have not been able to find any explanation for this frequently observed phenomenon.

It is quite usual for a person first fitted with the spectacles of my invention to be immediately capable of stereoscopic vision without any period of adjustment. Others have some initial difficulty when moving their eyes in a vertical plane. Instead of rotating their eyes in the usual manner, they are found to drop and raise their heads. After a few days, they become adjusted to the spectacles and move their eyes rather than their heads. Adjustment to horizontal eye movement is immediate in almost all cases.

I have found that most patients are made entirely comfortable by the mere addition of prism power to their corrective lenses without loss of visual acuity. In a minority of cases it is necessary fractionally to reduce the difference in the size of the retinal images produced in the two eyes although complete equalization is impractical and virtually impossible where one eye is aphakic. I therefore prefer to make the lens for the aphakic eye plano-convex, with the plane lens face in the posterior position, that is, facing the eye. If the dioptric power of the lens is high, it may be necessary to use a bi-convex lens. I then prefer to make the radius of curvature of the anterior lens face smaller than that of the posterior face. The frame is so constructed as to bring the posterior lens face as close to the pole of the cornea as the lashes will permit.

The lens for the complete eye is correspondingly spaced as far from the cornea as is possible, for example, for reasons of appearance. I may use cupped or meniscus lenses having a deeply concave posterior face and a convex anterior face somewhat matching the anterior face of the convex lens on the aphakic eye. The distance between the complete eye and the corresponding spectacle lens is increased as much as possible over that between the aphakic eye and its sharply convex lens, but this difference of lens spacings cannot basically alter the disparity of the retinal images, nor can it in itself significantly alleviate the afore-described symptoms which make binocular vision impossible.

In the extremely rare case of a complete eye which does not require any correction of refraction, I may employ a relatively heavy glass disc having no effective dioptric power. The cataract lenses of my invention when made of glass are quite heavy. When one eye is aphakic and the complete eye does not require any correction, it is necessary to balance the spectacle weight at least to some extent. The otherwise flat or cup shaped disc may be prismatically ground in the manner described above.

Other features and many of the attendant advantages of my invention will be readily appreciated as the same becomes better understood by reference to the following detailed description of specific embodiments thereof when considered in connection with the accompanying drawing wherein the sole figure shows a pair of spectacles of the invention in a sectional plan view.

The spectacle frame 1 essentially consists of two rim portions 5 fixedly connected by a bridge 3 and respectively equipped with two side-pieces 4 which are hingedly attached. The two rim portions respectively hold a plano-convex right lens 2 and a juxtaposed concave-convex left meniscus lens 6. The optical axes of the lenses are approximately parallel. The plane side of the right lens and the concave face of the left lens are arranged opposite the eyes of the wearer whose right eye is aphakic. Both lenses have a prismatic correction superimposed on their spherical curvature in such a manner that they taper in a direction from the bridge 3 toward the respective side-pieces 4. It will be understood that the lenses are not drawn to scale and that the curvatures of the lenses have been distorted to make the prismatic character of the lenses more apparent.

Actual lens configurations will be readily determined from the following specific examples of spectacle lenses for patients having one aphakic and one complete eye. For the sake of convenience, the aphakic eye is described in all examples as being the right eye regardless of the actual facts which may be otherwise. Those skilled in the art will appreciate that the numerical values listed are merely illustrative. In Table I there are listed the results of refraction tests indicating the required spherical and cylindrical dioptric powers of the lenses and the orientation of the axes of the cylindrical corrections for each example together with the desired combined prism power of both lenses and the visual acuity of the eyes when corrected individually. The average visual acuity of both eyes is arrived at by averaging the denominators of the fractions of 20 in which the visual acuity is expressed.

The respective curvatures of the anterior and posterior faces of each lens together with its prismatic deviation are then given. All values of spherical, cylindrical or prism power are expressed in diopters (D), axis angles in degrees. All prisms are base-in. O.D. and O.S. indicate the right and left eye respectively, as is conventional.

TABLE II

| Example | Eye | Spherical | Cylindrical | Axis | Prism | Visual Acuity |
|---------|-----|-----------|-------------|------|-------|---------------|
| I | O.D.<br>O.S. | +11.50<br>+1.75 | +1.50 | 165 | 12 | 20/20<br>20/20 |
| II | O.D.<br>O.S. | +10.50<br>−3.00 | +2.50<br>−0.75 | 10<br>25 | 11 | 20/40<br>20/30 |
| III | O.D.<br>O.S. | +14.00<br>+1.00 | +3.50<br>+0.50 | 20<br>105 | 9 | 20/40<br>20/60 |
| IV | O.D.<br>O.S. | +8.00<br>−5.00 | +3.75<br>−2.00 | 30<br>145 | 3 | 20/40<br>20/200 |
| V | O.D.<br>O.S. | +12.00<br>+5.00 | | | 7 | 20/40<br>20/100 |
| VI | O.D.<br>O.S. | +12.00<br> | +1.25<br> | 10<br> | 12 | 20/20<br>20/20 |

*Example I*

O.D.: Anterior, +11.50D to +13.00D; posterior, plano _____ 4D prism.
O.S.: Anterior, +5.75D; posterior −4.00D __ 8D prism.

*Example II*

O.D.: Anterior, +10.50D; posterior plano to +2.50D _____ 5D prism.
O.S.: Anterior, +4.50D to +5.25D; posterior, −8.25D _____ 6D prism.

*Example III*

O.D.: Anterior, +12.00D; posterior, +2.00D to +5.50D _____ 4D prism.
O.S.: Anterior, +6.00D to +6.50D; posterior, −5.00D _____ 5D prism.

*Example IV*

O.D.: Anterior, +9.00D to +12.75D; posterior, −1.00D _____ 1.5D prism.
O.S.: Anterior, +3.00D to +5.00D; posterior, −10.00D _____ 1.5D prism.

*Example V*

O.D.: Anterior, +12.00D; posterior, plano ___ 3D prism.
O.S.: Anterior, +8.00D; posterior, −3.00D___ 4D prism.

*Example VI*

O.D.: Anterior, +10.00D to +11.25D; posterior, +2.00D _____ No prism.
O.S.: Anterior, +6.00D; posterior, −6.00D _____ 12D prism.

The difference in spherical dioptric power between the two eyes after a unilateral cataract operation is close to twelve diopters if the eyes had similar refractive properties before the operation. Original differences in refractive power are normally reflected after the operation in a difference in the refractive power of the eyes which is different from a value of twelve diopters. Differences substantially in excess of twelve diopters are very rarely encountered, but thirteen diopters are not infrequent. Differences of moderately less than twelve diopters between the aphakic and the complete eye are less rare. I have not yet had an opportunity of testing the effect of my spectacles on patients in whom the difference between the aphakic and the complete eye amounted to less than seven diopters, corresponding to the rarely observed difference of five diopters between the power of the eyes prior to the operation.

The most encouraging results are achieved with patients whose visual acuity is 20/20 or better. Their binocular vision is restored by the spectacles of my invention in a manner not possible heretofore by any other means. Generally, I have observed that the average of the patients likely to benefit from my invention has a visual acuity of somewhat better than 20/40 and requiring a prism correction of approximately ten prism diopters. The distribution of their number about this mean value is quite unsymmetrical, breaking off rather sharply above 20/20 and the corresponding optimum prism power of twelve diopters, and tapering to a very low value at less than 20/100, corresponding to a prism power of three diopters.

It should be understood, of course, that the foregoing disclosure relates to preferred embodiments of the invention only, and that it is intended to cover all changes and modifications of the examples of the invention herein chosen for the purpose of the disclosure which do not constitute departures from the spirit and scope of the invention set forth in the appended claims.

What I claim is:

1. In spectacles, in combination, frame means; and two lens means juxtaposed on said frame means and having substantially parallel optical axes, one of said lens means having a power of approximately plus twelve spherical diopters, and the power of said other lens means being at least seven diopters smaller than that of said one lens means, said lens means having a combined prism power of approximately ten and not substantially more than twelve prism diopters base-in.

2. In spectacles as set forth in claim 1, said lens means each having an anterior and a posterior face, and said frame means including means for securing said spectacles to the head of a wearer with said posterior faces oppositely facing said head.

3. In spectacles as set forth in claim 2, the anterior face of said one lens means having a radius of curvature smaller than the radius of curvature of the posterior face of said one lens means.

4. In spectacles as set forth in claim 3, said posterior face being substantially plane.

5. In spectacles as set forth in claim 2, the anterior face of said other lens means being convex and the posterior face of said other lens means being concave.

6. In spectacles, in combination, frame means; and two lens means juxtaposed in said frame means and having substantially parallel optical axes, the power of said lens means differing by at least seven spherical diopters, and said lens means having a combined prism power of approximately ten and not substantially more than twelve prism diopters base-in.

7. In spectacles, in combination, frame means; and two lens means juxtaposed in said frame means and having substantially parallel optical axes, the power of said lens means differing by at least seven spherical diopters, and said lens means having a combined prism power of at least three and not substantially more than twelve prism diopters base-in.

References Cited in the file of this patent

UNITED STATES PATENTS

| | | |
|---|---|---|
| 1,636,450 | Ames | July 19, 1927 |
| 2,118,132 | Ames et al. | May 24, 1938 |
| 2,133,585 | Spero | Oct. 18, 1938 |

OTHER REFERENCES

Bausch et al.: Ophthalmic Lenses, Bausch & Lomb Optical Co., Rochester, N.Y., 1935, pages 77, 82–86 relied on.